US006504700B1

(12) United States Patent
Hahne et al.

(10) Patent No.: US 6,504,700 B1
(45) Date of Patent: Jan. 7, 2003

(54) ACTIVE DISCHARGE COLLECTOR FOR MINIMIZING POSITIVE AND/OR NEGATIVE CHARGES ON MOVING MATERIAL WEBS

(75) Inventors: Ernst August Hahne, Allschwil (CH); Franz Knopf, Buhl (DE)

(73) Assignee: Eltex-Elektrostatik GmbH, Weil (DE)

( * ) Notice: Subject to any disclaimer, the term of this patent is extended or adjusted under 35 U.S.C. 154(b) by 0 days.

(21) Appl. No.: 09/254,637

(22) PCT Filed: Mar. 10, 1998

(86) PCT No.: PCT/EP98/01382

§ 371 (c)(1), (2), (4) Date: Mar. 11, 1999

(87) PCT Pub. No.: WO98/42166

PCT Pub. Date: Sep. 24, 1998

(30) Foreign Application Priority Data

Mar. 18, 1997 (DE) .......................................... 197 11 342

(51) Int. Cl.[7] ................................................ H02H 1/00

(52) U.S. Cl. ....................................... 361/212; 361/220

(58) Field of Search ................................ 361/212, 220, 361/115

(56) References Cited

U.S. PATENT DOCUMENTS

| | | | | | |
|---|---|---|---|---|---|
| 4,042,971 | A | * | 8/1977 | Brennecke et al. | 361/213 |
| 4,835,808 | A | * | 6/1989 | Hahne et al. | 15/1.5 R |
| 6,007,784 | A | * | 12/1999 | Jorgensen | 422/186.05 |

FOREIGN PATENT DOCUMENTS

| | | | | |
|---|---|---|---|---|
| CH | 574176 | | * | 2/1976 |
| DE | 2713334 | A1 | * | 9/1978 |
| DE | 19520260 | A1 | * | 4/1995 |
| GB | 2114377 | A | * | 8/1983 |

* cited by examiner

*Primary Examiner*—Stephen W. Jackson
(74) *Attorney, Agent, or Firm*—Antonelli, Terry, Stout & Kraus, LLP

(57) ABSTRACT

The invention concerns an active discharge electrode (5) for minimizing positive and/or negative charges on moving material webs. The active discharge electrode (5) comprises a plurality of needle-shaped individual electrodes (8) which are disposed mutually parallel and can be connected to a high-voltage source, preferably a high-voltage transformer. The active discharge electrode (5) further comprises at least one earthing conductor (11) extending at right angles to and along the plurality of individual electrodes (8).

20 Claims, 1 Drawing Sheet

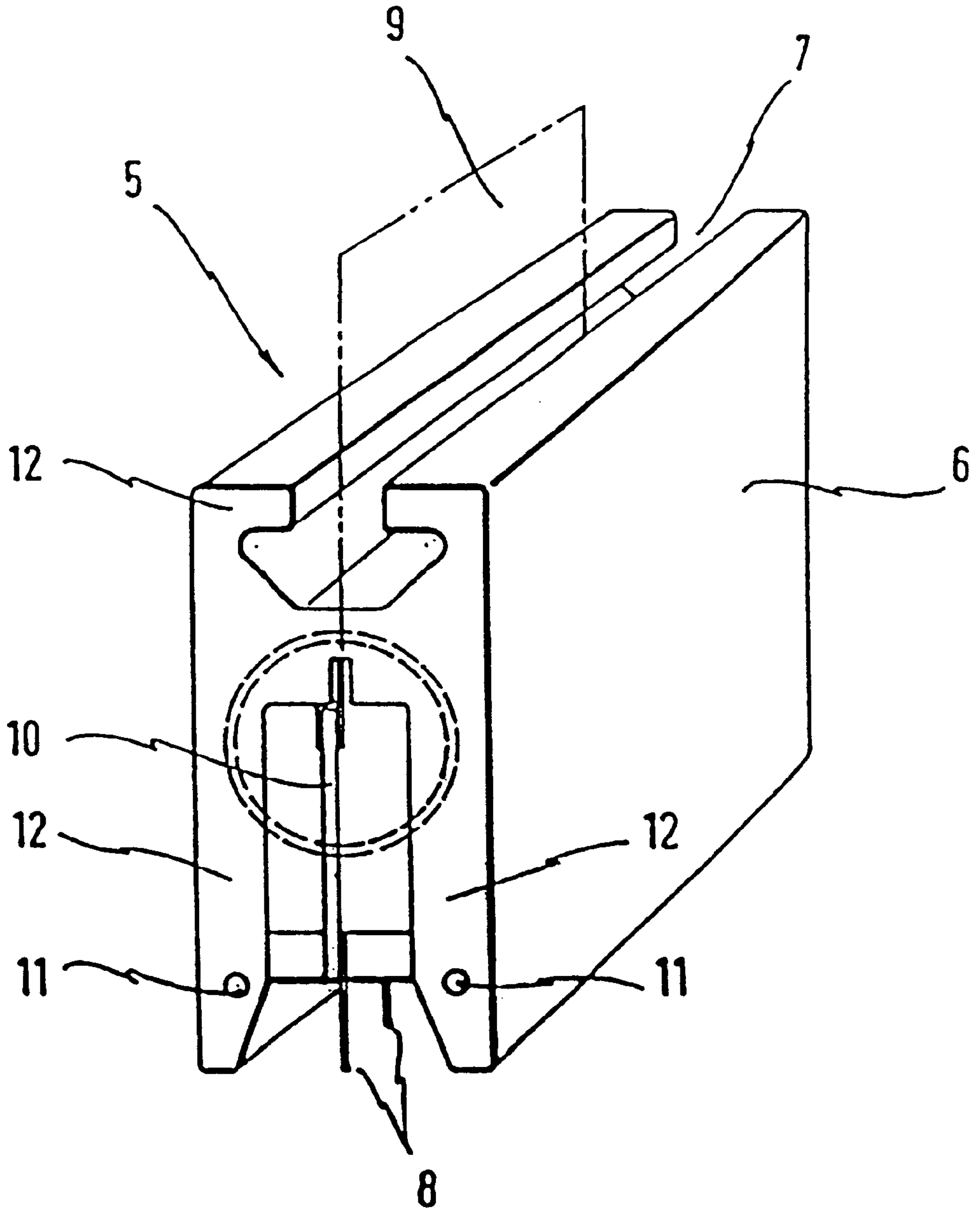
9
7
5
12
6
10
12
12
11
11
8

ACTIVE DISCHARGE COLLECTOR FOR MINIMIZING POSITIVE AND/OR NEGATIVE CHARGES ON MOVING MATERIAL WEBS

BACKGROUND OF THE INVENTION

1. Field of the Invention

The invention relates to and active discharge electrode.

2. Description of the Prior Art

Discharge electrodes are known as passive discharge electrodes in the form of grounded points or tongues in a plurality of embodiments. In addition, there are also so-called active discharge electrodes which can be connected to a source of high-voltage alternating current. They serve to discharge or eliminate positive and/or negative charges on the surface of preferably fast-moving material webs, like those used for example in gravure printing.

Usually these known active discharge electrodes have at least several rows of needle-shaped individual electrodes arranged parallel to one another, said electrodes being arranged parallel to one another within a row with a point at their free ends and can be connected to a source of high voltage. At least one ground conductor is located along a row of electrodes and preferably parallel thereto.

A study of such known active discharge electrodes has revealed that their efficiency during discharge is relatively poor and leaves a relatively high residual charge on the material web, especially on fast-moving material webs traveling at more than 2 to 3 meters per second. The same is true of plastics with closed surfaces, for example polymer films such as polycarbonate or polyester with a breakdown voltage of more than 4000 volts and a surface resistance of more than $10^{14}$ ohms and a specific volume resistance of $10^{14}$ ohms per cm.

SUMMARY OF THE INVENTION

The invention is an active discharge electrode which permits the highest possible charge in fast-moving material webs and in the above plastics, in which a double charge layer can form.

This goal is achieved in a discharge electrode according to the preamble of the main claim according to the invention by its characterizing features in a surprisingly simple fashion.

Remarkably, it has been found that when a plurality of rows of needle-shaped individual electrons run parallel to one another, the result of the discharge is not improved but on the contrary is even made worse. It has been found according the the invention that a single row of individual electrodes produces the best results. In addition, it has also surprisingly been found that efficiency is even further improved when the ground conductor is completely surrounded by an electrical insulator. Even with fast-moving material webs with a speed on the order of more than 10 meters per second, a maximum possible discharge can be achieved. In the electrode according to the invention, there is also the advantage if the power fails that the row of individual electrodes act as passive discharge electrodes so that at least a minimum of functional ability is retained despite the power failure. This effect, again surprisingly, does not occur when the connections between the ground conductor and the individual electrodes are switched, in other words the ground conductor is connected to a source of high voltage alternating current and the needle-shaped individual electrodes are grounded. According to the invention, the individual electrodes are connected to a voltage form the high voltage alternating current source that is symmetrical with respect to ground.

BRIEF DESCRIPTION OF THE DRAWING

FIG. 1 illustrates an embodiment of the present invention.

DESCRIPTION OF THE PREFERRED EMBODIMENTS

In particular, when two ground conductors are provided that are parallel to one another and are located on both sides of the row of individual electrodes, an increase in efficiency and hence improved discharge are obtained.

When in addition each individual electrode is connected through an ohmic resistance to the high voltage source, effective protection against contact is provided at the same time, which shows a schematic cross section through an active discharge electrode according to the invention.

The discharge electrode marked as a whole by 5 has a profile 6 that has a fastening groove 7 on the back for fastening the electrode.

It is provided with a single row of needle-shaped individual electrodes 8 arranged parallel to one another, whose free ends are located on the opposite side relative to fastening groove 7. The row of individual electrodes lies in a plane 9 indicated schematically in the drawing. In addition, each individual electrode 8 can be connected by an ohmic resistance 10 to the high voltage source, not shown, which represents a source of alternating voltage.

In addition, in the embodiment shown here, two ground conductors 11 are provided that are parallel to one another and located on both sides of the row of individual electrodes 8, the ground conductors being circular in cross section and made of wire for example. These two ground conductors run at right angles to the direction of each individual electrode 8 and parallel to the plane 9 in which the individual electrodes of a row are located. Each conductor is surrounded by an electrical insulator 12.

What is claimed is:

1. An active discharge electrode for minimizing positive and/or negative charges on moving material webs, with a plurality of needle-shaped individual electrodes located parallel to one another, which can be connected to a high-voltage source and with at least one ground conductor that runs at right angles to and along the plurality of individual electrodes comprising:

a single row of the plurality of parallel individual electrodes; and the at least one ground conductor is completely surrounded by an electrical insulator and is embedded in an electrical insulator.

2. An active discharge electrode for minimizing positive and/or negative charges on moving material webs, with a plurality of needle-shaped individual electrodes located parallel to one another, which can be connected to a high-voltage source and with at least one ground conductor that runs at right angles to and along the plurality of individual electrodes comprising:

a single row of the plurality of parallel individual electrodes;

the at least one ground conductor is completely surrounded by an electrical insulator; and the single row of the plurality of individual electrodes lies in a plane.

3. An electrode according to claim 1, wherein:

the single row of the plurality of individual electrodes lies in a plane.

4. An active discharge electrode for minimizing positive and/or negative charges on moving material webs, with a plurality of needle-shaped individual electrodes located parallel to one another, which can be connected to a high-voltage source and with at least one ground conductor that runs at right angles to and along the plurality of individual electrodes comprising:

a single row of the plurality of parallel individual electrodes;

the at least one ground conductor is completely surrounded by an electrical insulator; and ground conductors are provided that are parallel to one another and located on both sides of the single row of the plurality of individual electrodes.

5. An electrode according to claim 1, wherein:

ground conductors are provided that are parallel to one another and located on both sides of the single row of the plurality of individual electrodes.

6. An electrode according to claim 2, wherein:

ground conductors are provided that are parallel to one another and located on both sides of the single row of the plurality of individual electrodes.

7. An active discharge electrode for minimizing positive and/or negative charges on moving material webs, with a plurality of needle-shaped individual electrodes located parallel to one another, which can be connected to a high-voltage source and with at least one ground conductor that runs at right angles to and along the plurality of individual electrodes comprising:

a single row of the plurality of parallel individual electrodes;

the at least one ground conductor is completely surrounded by an electrical insulator; and each ground conductor is circular in cross section.

8. An electrode according to claim 1, wherein:

each ground conductor is circular in cross section.

9. An electrode according to claim 2, wherein:

each ground conductor is circular in cross section.

10. An electrode according to claim 3, wherein:

each ground conductor is circular in cross section.

11. An electrode according to claim 7, wherein:

the ground conductor is a wire.

12. An electrode according to claim 8, wherein:

the ground conductor is a wire.

13. An electrode according to claim 9, wherein:

the ground conductor is a wire.

14. An electrode according to claim 10, wherein:

the ground conductor is a wire.

15. An active discharge electrode for minimizing positive and/or negative charges on moving material webs, with a plurality of needle-shaped individual electrodes located parallel to one another, which can be connected to a high-voltage source and with at least one ground conductor that runs at right angles to and along the plurality of individual electrodes comprising:

a single row of the plurality of parallel individual electrodes;

the at least one ground conductor is completely surrounded by an electrical insulator; and each individual electrode is connected to the high-voltage source by resistance.

16. An electrode according to claim 15, wherein the resistance is 250 megohms.

17. An active discharge electrode for minimizing positive and/or negative charges on moving material webs, with a plurality of needle-shaped individual electrodes located parallel to one another, which can be connected to a high-voltage source and with at least one ground conductor that runs at right angles to and along the plurality of individual electrodes comprising:

a single row of the plurality of parallel individual electrodes;

the at least one ground conductor is completely surrounded by an electrical insulator; and the spacing of tips of the individual electrodes is between 1 and 2 cm.

18. An electrode in accordance with claim 17, wherein:

the spacing is approximately 1.5 cm.

19. An active discharge electrode for minimizing positive and/or negative charges on moving material webs, with a plurality of needle-shaped individual electrodes located parallel to one another, which can be connected to a high-voltage source and with at least one ground conductor that runs at right angles to and along the plurality of individual electrodes comprising:

a single row of the plurality of parallel individual electrodes;

the at least one ground conductor is completely surrounded by an electrical insulator; and the electrodes are connected to a high-voltage alternating-current source that is symmetrical relative to ground.

20. An active discharge electrode for minimizing positive and/or negative charges on moving material webs, with a plurality of needle-shaped individual electrodes located parallel to one another, which can be connected to a high-voltage source and with at least one ground conductor that runs at right angles to and along the plurality of individual electrodes comprising:

a single row of the plurality of parallel individual electrodes; and the at least one ground conductor is completely surrounded by an electrical insulator and the ground conductor is embedded in an electrical insulator, each individual electrode is connected to the high-voltage source by resistance and the electrodes are connected to a high-voltage alternating current source that is symmetrical relative to ground.

* * * * *